UNITED STATES PATENT OFFICE.

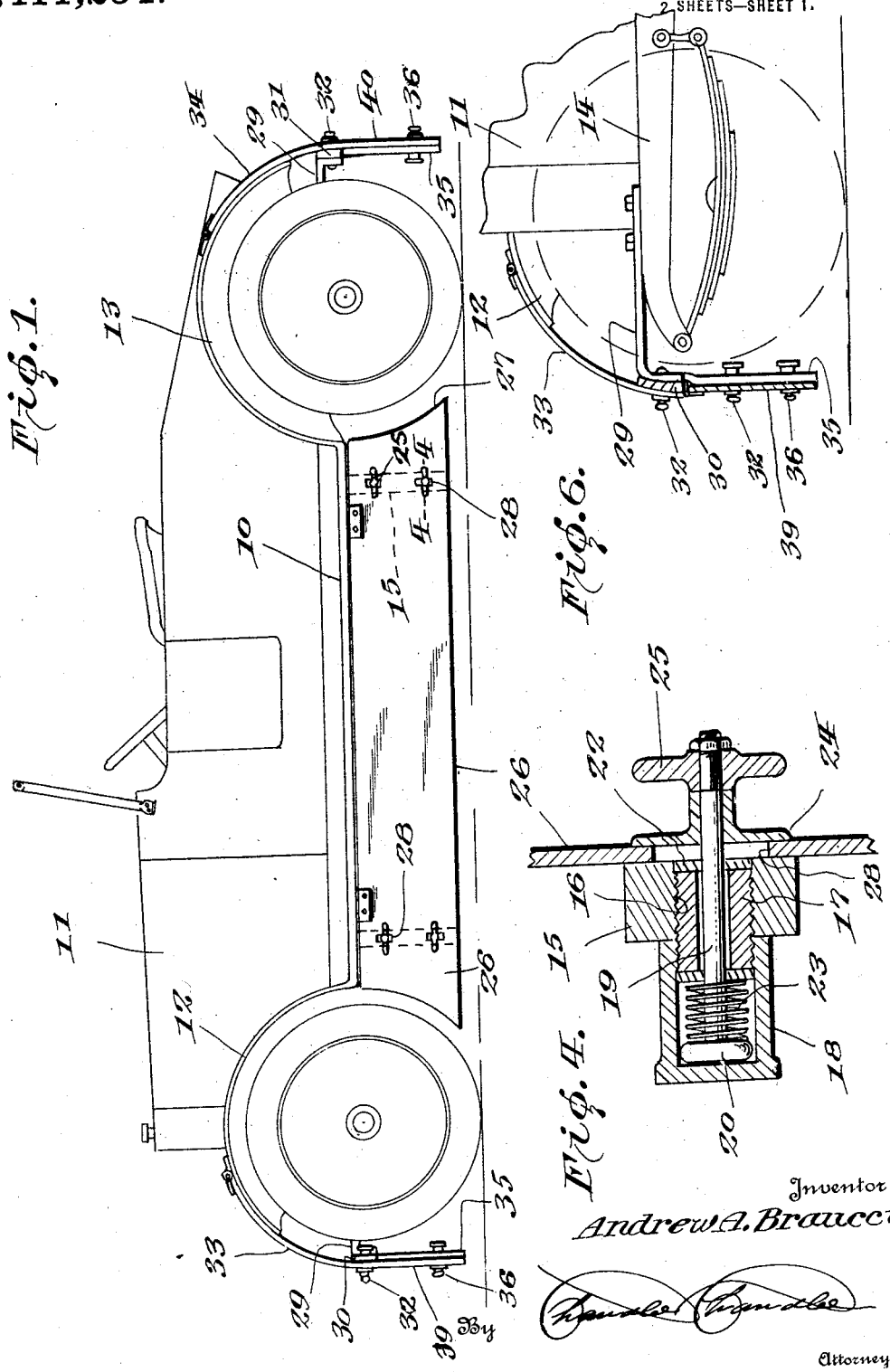

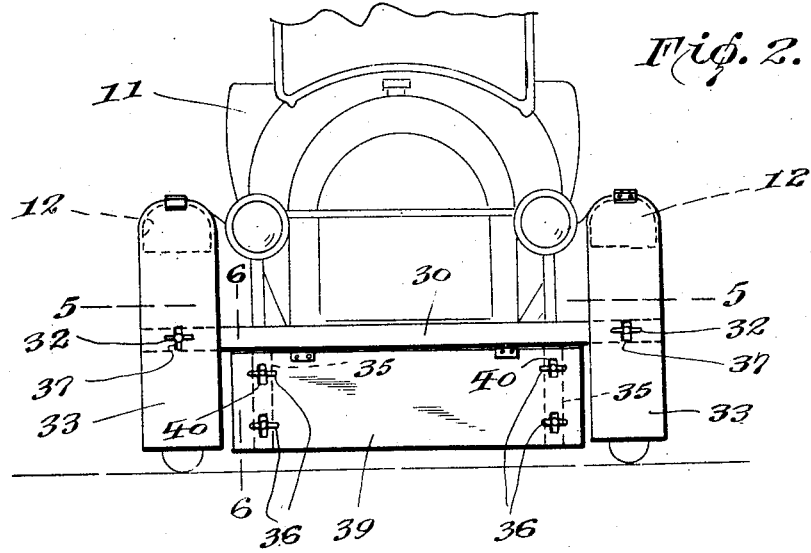
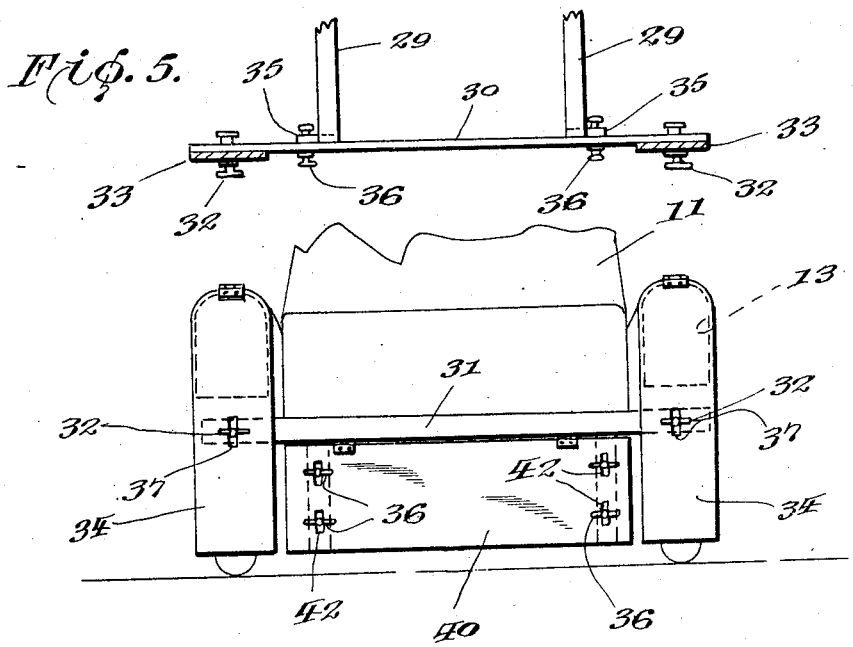

ANDREW A. BRAUCCI, OF NEW YORK, N. Y.

SAFETY GUARD FOR AUTOMOBILES.

1,411,254.   Specification of Letters Patent.   Patented Apr. 4, 1922.

Application filed April 18, 1921. Serial No. 462,264.

*To all whom it may concern:*

Be it known that I, ANDREW A. BRAUCCI, a subject of Italy, residing at New York, in the county of New York, State of New York, have invented certain new and useful Improvements in Safety Guards for Automobiles; and I do hereby declare the following to be a full, clear, and exact description of the invention, such as will enable others skilled in the art to which it appertains to make and use the same.

This invention relates to new and useful improvements in guards and particularly to guards for automobiles or like vehicles.

One object of the invention is to provide guards for an automobile which will prevent a person, who has been struck by the automobile, from getting beneath the automobile.

Another object is to provide a set of guards of this character which can be quickly and easily raised to permit access to the mechanism of the automobile for adjustments and repairs.

Other objects and advantages will be apparent from the following description when taken in connection with the accompanying drawings.

In the drawings:

Figure 1 is a side elevation of an automobile equipped with the improved guards.

Figure 2 is a front elevation of the same.

Figure 3 is a rear elevation of the same.

Figure 4 is an enlarged horizontal sectional view through the locking means of one of the side guards carried by the running board, on the line 4—4 of Figure 1.

Figure 5 is a horizontal transverse sectional view taken longitudinally of the connecting bar of the front auxiliary guards, on the line 5—5 of Figure 2.

Figure 6 is a vertical section longitudinally of the vehicle and taken on line 6—6 of Figure 2.

Referring particularly to the accompanying drawings, 10 represents the running board of the automobile 11, while 12 and 13 represent the front and rear mud guards thereof. The chassis is represented by the numeral 14.

Secured to the lower face of each running board is an angle bar 15, the vertical arm of which depends from a point adjacent the outer edge of the board and is formed with the openings 16 in which are secured the sleeves 17. Carried by the inner end of each sleeve 17, and projecting from the inner vertical face of a bar 15, is a casing 18. Slidably disposed through the sleeve 17 and into the casing 18, is a stem 19, having on its inner end a head 20. In the inner end of the sleeve is a centrally apertured plate 21, and in the outer end thereof is a similar plate 22, through the apertures of which the said stem is disposed and properly guided. Encircling the stem, and bearing with its opposite ends against the inner plate 21 and the head 20, is a coil spring 23, the tendency of which is to normally draw the stem inwardly. On the stem, outwardly of the bar 15, is a transverse head 24, and detachably secured on the stem, outwardly of the head 24, to maintain the head thereon, is a fingerpiece 25.

Hinged to the outer edge of the running board is a depending plate 26 which extends throughout the length of the running board and has its opposite ends cut on curved lines to lie concentric with the peripheries of the front and rear wheels of the automobile, as shown at 27. In each end portion of the plate 26 there are formed the vertically aligned and elongated openings 28, said openings being of such dimensions as will readily permit the passage of the head 24 therethrough, when the plate is swung down into vertical position. When the heads 24 are thus passed through the openings 28 the finger-piece 25 is grasped and the stem rotated so as to dispose the heads transversely of the openings, with the result that the springs 23 will draw the heads against the plate, and hold the plate against swinging movement or tendency to rattle.

Secured to the front and rear ends of the chassis of the automobile, are the angle bars 29, and secured to and extending between the said angle bars are the metal strips 30 and 31, respectively, the same having the rotary locking means 32, similar to those described in connection with the side plates.

Hinged to the forward end portions of the front and rear mud guards 12 and 13, are the curved auxiliary guards 33 and 34, respectively, said guards being disposed in partial enclosing relation to the adjacent portions of the front and rear wheels of the automobile. On the ends of the said bars or strips 30 and 31, are the before-mentioned locking means 32, which engage in the slots 37 of the auxiliary guards. Secured to the front and rear transverse bars 30 and 31 are the depending strips 35, each being provided with locking means 36, similar to the locking means 32. Hinged to these bars 30 and 31, are the depending guard plates 39 and 40, respectively, which are formed with the slots 41 and 42 for the reception of the locking devices 36.

It will be noted that the lower edge of all of the guard plates and housings are disposed at the same distance from the ground. This, in practice, is approximately six inches, for the purpose of preventing a person from rolling beneath the automobile.

Upon rotating the locking devices so that the heads 24 will lie longitudinally of the openings of the hinged members, the guard plates as well as the auxiliary guards may be readily raised to permit access to the mechanism of the automobile for adjustments and repairs.

What is claimed is:

1. The combination with a chassis of an automobile, having angle members mounted on the main, rear and side thereof, depending bars carried by the angle members, turn buttons carried by the depending bars, and depending plates hinged to the angle members and provided with elongated openings for the reception of the turn buttons.

2. A locking device comprising an apertured support, a casing carried by the support, a sleeve engaged in the apertured support and in the casing and having a central bore therethrough, a flange slidable through the sleeve, a spring on the flange engaging with the sleeve and the flange, and an elongated transversely extending head fixed on the flange exteriorly of the casing.

In testimony whereof, I affix my signature, in the presence of two witnesses:

ANDREW A. BRAUCCI.

Witnesses:
LEO LUCA NICOLOSI,
CARMILLO GUERRIERO.